(12) United States Patent
    Yee et al.

(10) Patent No.: US 12,687,444 B2
(45) Date of Patent: Jul. 21, 2026

(54) ACTIVE AGGRESSOR DETECTION IN PRESSURE SENSOR PORT

(71) Applicant: Apple Inc., Cupertino, CA (US)

(72) Inventors: Seow Yuen Yee, Mountain View, CA (US); Michael J. Glickman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 18/226,717

(22) Filed: Jul. 26, 2023

(65) Prior Publication Data

US 2024/0085258 A1      Mar. 14, 2024

Related U.S. Application Data

(60) Provisional application No. 63/405,321, filed on Sep. 9, 2022.

(51) Int. Cl.
    *G01L 7/08*      (2006.01)
    *G01D 21/02*      (2006.01)
    *G01L 27/00*      (2006.01)

(52) U.S. Cl.
    CPC .............. *G01L 7/088* (2013.01); *G01D 21/02* (2013.01); *G01L 7/082* (2013.01); *G01L 27/002* (2013.01)

(58) Field of Classification Search
    None
    See application file for complete search history.

(56) References Cited

U.S. PATENT DOCUMENTS

| | | | |
|---|---|---|---|
| 10,739,221 B2 * | 8/2020 | Balasubramanian | ..... G01L 9/12 |
| 11,422,104 B2 * | 8/2022 | Han | ..... G06F 1/1684 |
| 11,719,671 B2 * | 8/2023 | Akhbari | ..... G06F 3/043 |
| | | | 73/627 |
| 11,835,401 B2 * | 12/2023 | Teodorescu | ..... G01L 1/14 |
| 2023/0194375 A1 * | 6/2023 | Sugibayashi | ..... G01L 19/12 |
| | | | 702/52 |

FOREIGN PATENT DOCUMENTS

CN            114674465 A  *  6/2022  ............. B32B 37/12

\* cited by examiner

*Primary Examiner* — Peter J Macchiarolo
*Assistant Examiner* — Jermaine L Jenkins
(74) *Attorney, Agent, or Firm* — BAKERHOSTETLER

(57)                ABSTRACT

Aspects of the subject technology relate to an apparatus having a housing, including a port exposed to an environment. The apparatus includes a pressure sensor disposed within the housing to measure a pressure of the environment. The pressure sensor includes a membrane to facilitate detection of a presence of an aggressor by using dynamic response analysis.

20 Claims, 7 Drawing Sheets

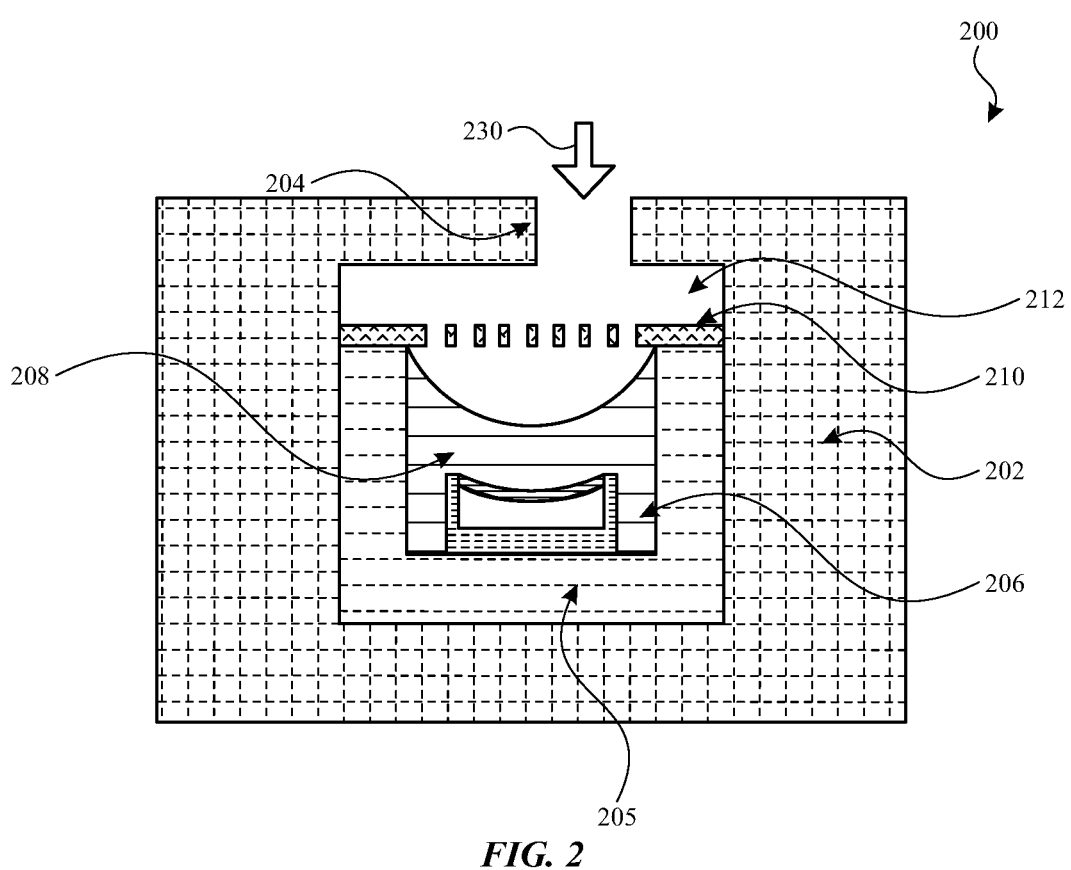
FIG. 2
SENSING MODE                                    ACTUATING MODE
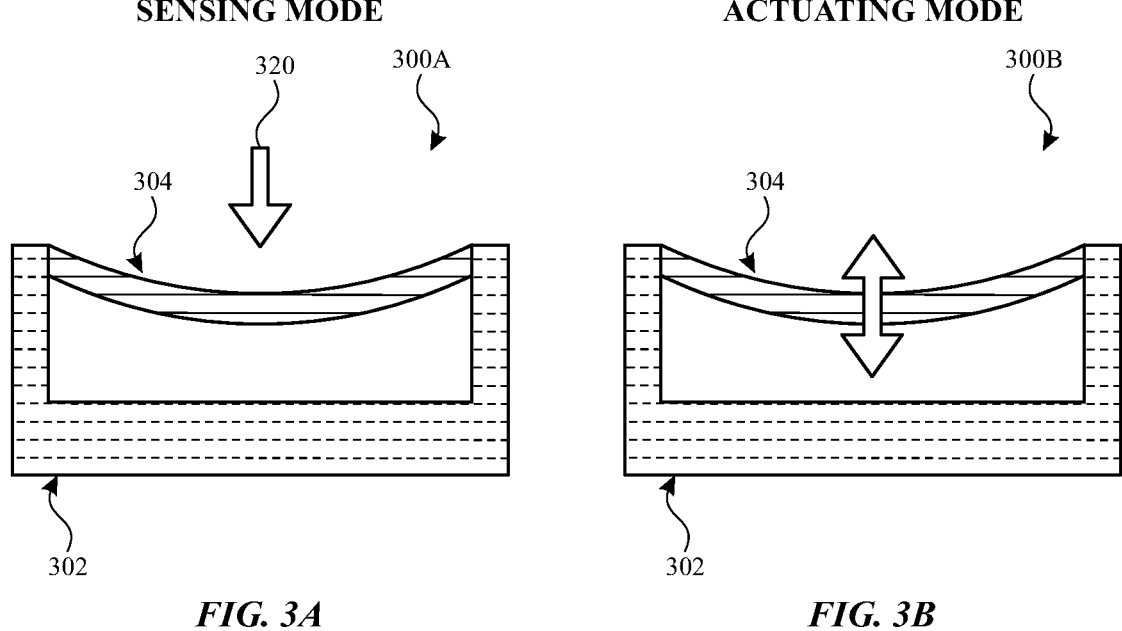
FIG. 3A                                         FIG. 3B

ACTIVE AGGRESSOR DETECTION IN PRESSURE SENSOR PORT

CROSS-REFERENCE TO RELATED APPLICATION(S)

This application claims the benefit of U.S. Provisional Application Ser. No. 63/405,321, entitled "ACTIVE AGGRESSOR DETECTION IN PRESSURE SENSOR PORT" and filed on Sep. 9, 2022, the disclosure of which is expressly incorporated by reference herein in its entirety.

TECHNICAL FIELD

The present description relates generally to electronic devices and more particularly, but not exclusively, to active aggressor detection in a pressure sensor port.

BACKGROUND

Pressure sensors are being increasingly integrated into wearable and portable devices such as smartwatches and smartphones. The pressure sensors integrated in smart devices can be used to measure elevation and depth in water, as well as other applications. Water pressure sensors need to be exposed to water to measure pressure. Directly exposing an integrated pressure sensor to water can lead to permanent damage or error in pressure measurement. For example, when water enters the cavity above the sensor (e.g., on top of the gel) through the opening port of the housing, the mass of the water can cause a pressure sensing error due to added hydrostatic pressure. When the cavity above the sensor is relatively large, the water ingress can be detected using an existing algorithm. However, for pressure sensor designs with significantly reduced size, the water ingress is harder to be detected or differentiated from a dry (no water) condition. The water detection can be beneficial for either calibrating out the impact of water on the pressure measurement or for disregarding the collected pressure data in the presence of water in the cavity until the water dries out.

BRIEF DESCRIPTION OF THE DRAWINGS

Certain features of the subject technology are set forth in the appended claims. However, for purposes of explanation, several aspects of the subject technology are set forth in the following figures.

FIG. 2 is a schematic diagram illustrating a cross-sectional view of an example of a pressure-sensing apparatus with an active aggressor detection in the presence of an applied pressure, in accordance with various aspects of the subject technology.

FIGS. 3A and 3B are diagrams illustrating cross-sectional views of the example pressure sensor device of the pressure-sensing apparatus of FIG. 1A in sensing and actuating modes, in accordance with various aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure is directed to active aggressor detection in a pressure sensor port. Some aspects of the subject technology relate to an apparatus having a housing that includes a port exposed to an environment. The apparatus includes a pressure sensor disposed within the housing to measure a pressure of the environment. The pressure sensor includes a membrane to facilitate detection of a presence of an aggressor by using a dynamic response analysis.

In one or more implementations, the subject technology relates to an electronic device including a pressure-sensing apparatus that can operate in a sensing mode and an actuating mode to generate signals (e.g., pressure or other mechanical or electrical signals)) for the sensing mode and resonance signals for the actuating mode, respectively. The electronic device further includes a processor to process the pressure signals and the resonance signals. The pressure-sensing apparatus includes a housing having a port exposed to an environment and a pressure sensor device including two or more electrodes placed on a membrane and corresponding pairing electrodes on the housing to form capacitors, as discussed in more details herein. The electrodes facilitate measurement of the pressure of the environment and detection of the presence of an aggressor by providing the resonance signals. The resonance signals are associated with the resonance of the membrane of the pressure sensor device.

In one or more aspects, the subject disclosure is directed to an apparatus having a housing that includes a port exposed to an environment and a pressure sensor disposed within the housing to measure a pressure of the environment. The pressure sensor includes a membrane that facilitates detection of a presence of an aggressor by operating in a traveling-wave mode of operation.

Figure 1A:
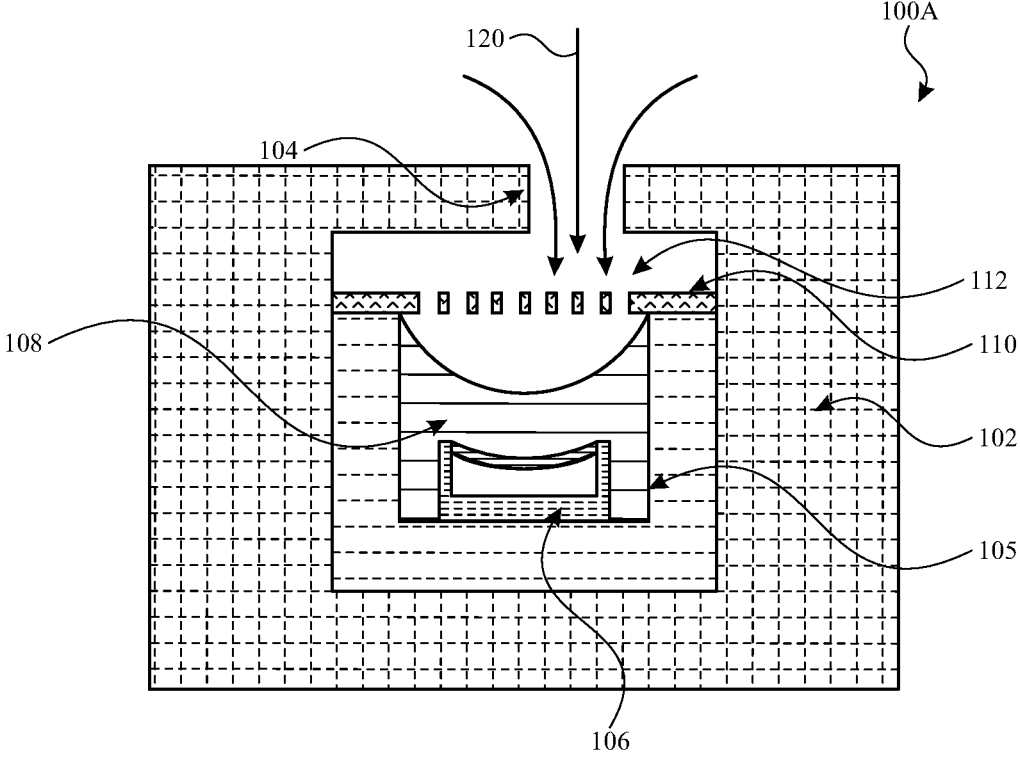
FIG. 1A is a schematic diagram illustrating a cross-sectional view of an example of a pressure-sensing apparatus with an active aggressor detection, in accordance with various aspects of the subject technology.

FIG. 1A is a schematic diagram illustrating a cross-sectional view of an example of a pressure-sensing apparatus 100A with an active aggressor detection, in accordance with various aspects of the subject technology. The pressure-sensing apparatus 100A (hereinafter, apparatus 100A) includes a housing 102, a port 104, a pressure sensor device 106, a sensor device container 105, a water-proofing medium 108 (e.g., a gel), and a protective cover 110 (e.g., a mesh or a cap with holes that are offset from the projection of the port 104). The housing 102 can be made, for example, from a metal such as aluminum or stainless steel, but is not limited to these metals, and can be made of any qualified metal or other material. The port 104 is an opening in the housing 102 and allows exposure to the surrounding environment. In some aspects, the surrounding environment can be a liquid (such as water), in which case the pressure sensor device 106 is a liquid (water) pressure sensor and the port 104 exposes the apparatus 100A to the liquid (water) that forms an inflow 120. In other aspects, the surrounding environment can be an atmosphere, for which case the pressure sensor device 106 is a barometric pressure sensor and the port 104 exposes the apparatus 100A to the inflow 120, which in this case can be a gas (e.g., air). The pressure sensor device 106 has to be protected from the potentially harsh environments it needs to operate in (e.g., dust, salt, water, damage due to probing, etc.). In addition, this protection should reduce any error in the pressure reading of the pressure sensor device 106, for example, due to noise, offset, or latency in pressure measurement. The accumulation of an aggressor, such as a liquid (e.g., water) or solid matter (e.g., particulate matter) in the cavity 112 can cause errors in the pressure measurement by the pressure sensor device 106. The subject technology provides an active aggressor detection, as discussed in more details herein.

Figure 1B:
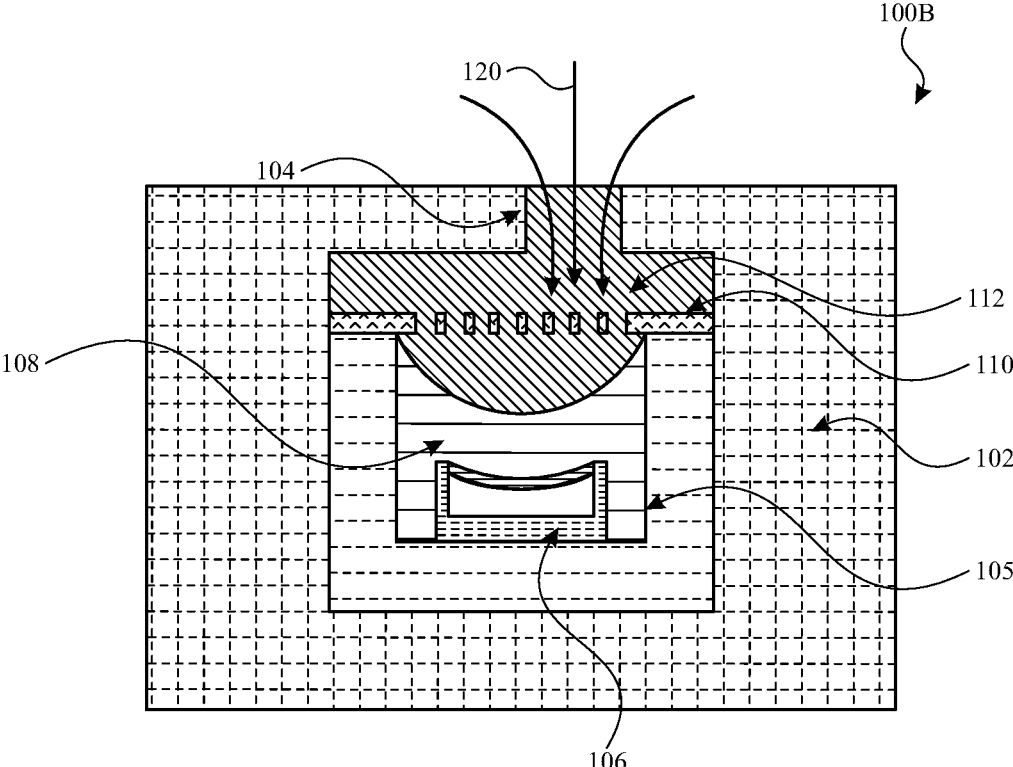
FIG. 1B is a schematic diagram illustrating a cross-sectional view of an example of a pressure-sensing apparatus with an active aggressor detection in the presence of a liquid aggressor, in accordance with various aspects of the subject technology.

FIG. 1B is a schematic diagram illustrating a cross-sectional view of an example of a pressure-sensing apparatus 100B with an active aggressor detection in the presence of a liquid aggressor, in accordance with various aspects of the subject technology. The pressure-sensing apparatus 100B is similar to the pressure-sensing apparatus 100A of FIG. 1A, except that the cavity 112 of FIG. 1A is now filled with a liquid aggressor 114 (e.g., water or other liquids) that can exert an unwanted pressure on the water-proofing medium 108 and thus cause pressure offset errors. The detection of the presence of the liquid aggressor 114 by using the subject technology is crucial to either calibrate pressure sensor device 106 or to disregard the measurement data until the liquid aggressor 114 substantially vacates the cavity 112 (e.g., water dries, evaporates, or otherwise exits the cavity 112).

Figure 1C:
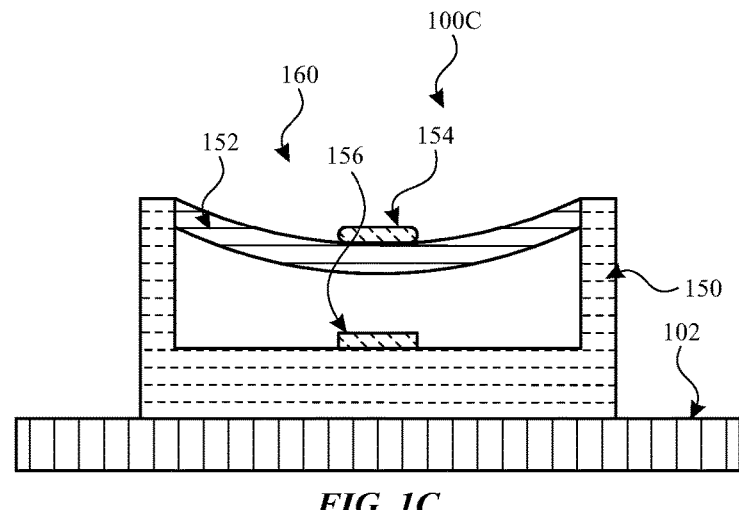
FIGS. 1C and 1D are schematic diagrams illustrating cross-sectional views of an example pressure sensor device of the pressure-sensing apparatus of FIG. 1A, in accordance with various aspects of the subject technology.
Figure 1D:
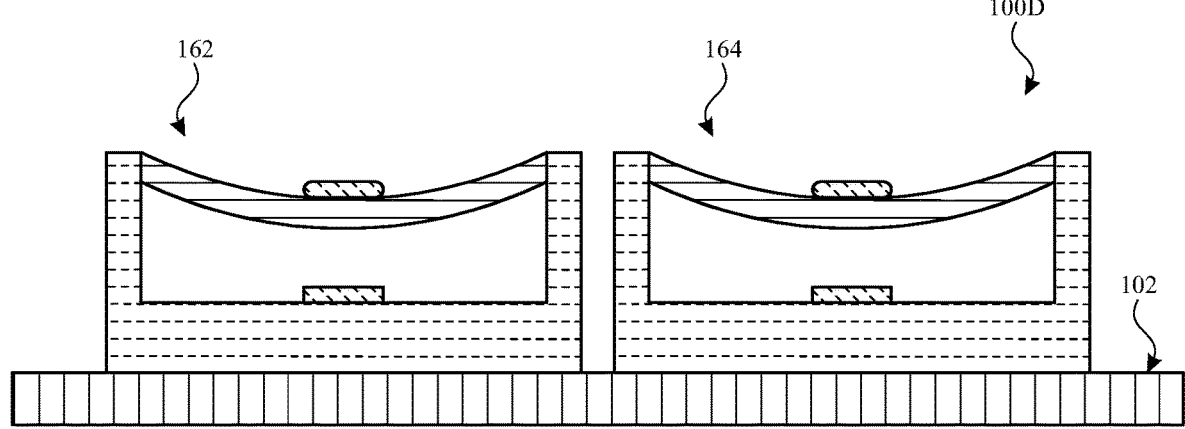

FIGS. 1C and 1D are schematic diagrams illustrating a cross-sectional views 100C and 100D of examples of pressure sensor devices 160, 162 and 164 in accordance with various aspects of the subject technology. The cross-sectional view 100C shows the pressure sensor device 160, which shows more detailed structure of the pressure sensor device 106 of FIG. 1A. The pressure sensor device 160 is disposed on the housing 102, of which only the bottom plate is shown for simplicity. The pressure sensor device 160 includes a membrane 152 of the pressure sensor device 106 (not shown in FIGS. 1A and 1B) supported by a sensor support structure 150. The membrane 152 includes an electrode 154, which forms a capacitor with a corresponding pairing electrode 156 disposed on an internal surface of the sensor support structure 150, as shown in FIG. 1C. The pair of electrodes 154 and 156 facilitate detection of the presence of an aggressor (e.g., a liquid such as water) in the cavity 112 of FIG. 1A by using a dynamic response analysis, as discussed herein. In some implementations, the pair of electrodes 154 and 156 are used both in sensing mode and actuating mode. For example, the pair of electrodes 154 and 156 may be used in a sensing mode for a period of time to measure an applied pressure. Also, the pair of electrodes 154 and 156 can be used in an actuating mode to induce vibrations of the membrane 152 in a first time interval and switch to a sensing mode in a second time interval (e.g., a succeeding time interval) to detect a resonance response of the membrane 152.

In some implementations, two or more of the pressure sensor devices, for example, 162 and 164, which are similar to the pressure sensor device 160, may be disposed over the housing 102. One of the pressure sensor devices, for example, 162 can be operated in a sensing mode, while the pressure sensor device 164 is operated in an actuating mode. The pressure sensor device 162 may be used for pressure measurement or resonance response detection, and the pressure sensor device 164 can be used to induce vibrations of the membrane 152. In one or more implementations, the number of pressure sensor devices disposed on the housing 102 is not limited to two. For example, several pressure sensor devices may be disposed to be used in a multiplex configuration.

membrane 152 may include two or more electrodes 154 and corresponding pairing electrodes 156. The pair of electrodes 154 and 156 can be made of a thin layer of a conductive material such as a metal (e.g., copper, aluminum, silver, gold, or other metals) or a conductive compound (e.g., alloy). The pair of electrodes 154 and 156 can be made in any shape such as square, circular, hexagonal, or any other shape.

The signals from the electrodes dedicated to pressure measurement are pressure signals, and the signals from the rest of the electrodes are resonance signals that are used by an electronic device 100E of the subject technology to perform a dynamic response analysis based on the resonance signals, as discussed herein, to detect the presence of an aggressor (e.g., the liquid aggressor 114 of FIG. 1B).

It should be noted that although the aggressor in the above description is considered to be a liquid aggressor, the subject technology is not limited to liquid aggressors and can be applied to detect other aggressors such as solid aggressors (e.g., particulate matter).

Figure 1E:
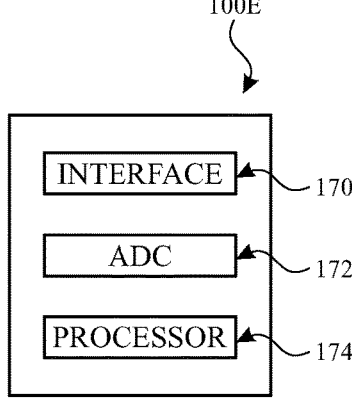
FIG. 1E is a schematic diagram illustrating an example of an electronic device for processing signals from the pressure-sensing apparatus of FIG. 1A, in accordance with various aspects of the subject technology.

FIG. 1E is a schematic diagram illustrating an example of an electronic device 100E for processing signals from the pressure-sensing apparatus of FIG. 1A, in accordance with various aspects of the subject technology. The electronic device 100E includes, but is not limited to, an interface 170, an analog-to-digital converter (ADC) 172, and a processor 174. The interface 170 receives signals (e.g., pressure signals and resonance signals) from the pair of electrodes 154 and 156 of FIG. 1C and performs conditioning of these signals, which can include amplification and noise reduction to produce suitable analog signals for conversion to digital signals by the ADC 172. The digital signals provided by the ADC 172 are processed by the processor 174 to perform a dynamic response analysis as discussed herein.

FIG. 2 is a schematic diagram illustrating a cross-sectional view of an example of a pressure-sensing apparatus 200 (hereinafter, apparatus 200) with an active aggressor detection in the presence of an applied pressure, in accordance with various aspects of the subject technology. The pressure-sensing apparatus 200 is similar to the apparatus 100A of FIG. 1A and includes a housing 202, a port 204, a pressure sensor device 206, a sensor device container 205, a water-proofing medium 208 (e.g., a gel), and a protective cover 210 (e.g., a mesh or a cap with holes). An applied pressure 230 (e.g., the ambient pressure of an environment) is directly applied to the water-proofing medium 208, which conveys the pressure to the pressure sensor device 206. The measured pressure by the pressure sensor device 206 is not affected by errors due to a presence of an aggressor (e.g., a liquid or solid aggressor).

The top surface of the water-proofing medium 208 has a known profile or shape (e.g., substantially flat, parabolic, known arc, etc.) which can be used to compare with the surface profile when a liquid or solid aggressor is present in the cavity 212. The surface profile can be determined using ultrasonic waves, as discussed herein. The surface profile difference measured using the ultrasonic waves can be used to calibrate the pressure sensor device 206 or be utilized as an indication of erroneous measured data that should be disregarded when the surface profile difference is sufficiently significant.

FIGS. 3A and 3B are diagrams illustrating cross-sectional views 300A and 300B of the example pressure sensor device 206 of the pressure-sensing apparatus of FIG. 2 in sensing and actuating modes, respectively, in accordance with various aspects of the subject technology. The cross-sectional view 300A of the pressure sensor device 206 shows a casing 302 and a membrane 304 that is deformed due to an applied pressure 320. In the scenario shown in FIG. 3A, the pressure sensor device 206 is operating in a sensing mode so that deformation of the membrane 304 can be measured in a known capacitive pressure-sensing mode.

The scenario shown in FIG. 3B shows the pressure sensor device 206 operating in an actuating mode, where the double arrow conveys that the membrane 304 resonates by moving in both directions. The resonance characteristic of the membrane 304 is measured through signals from one or more electrodes (pair of electrodes 154 and 156) and is analyzed by the processor 174 of FIG. 1E. The result of the analysis reveals qualitative and qualitative assessment of the presence of an aggressor within the cavity (e.g., 212 of FIG. 2) of the apparatus 200, as discussed herein.

Figure 4:
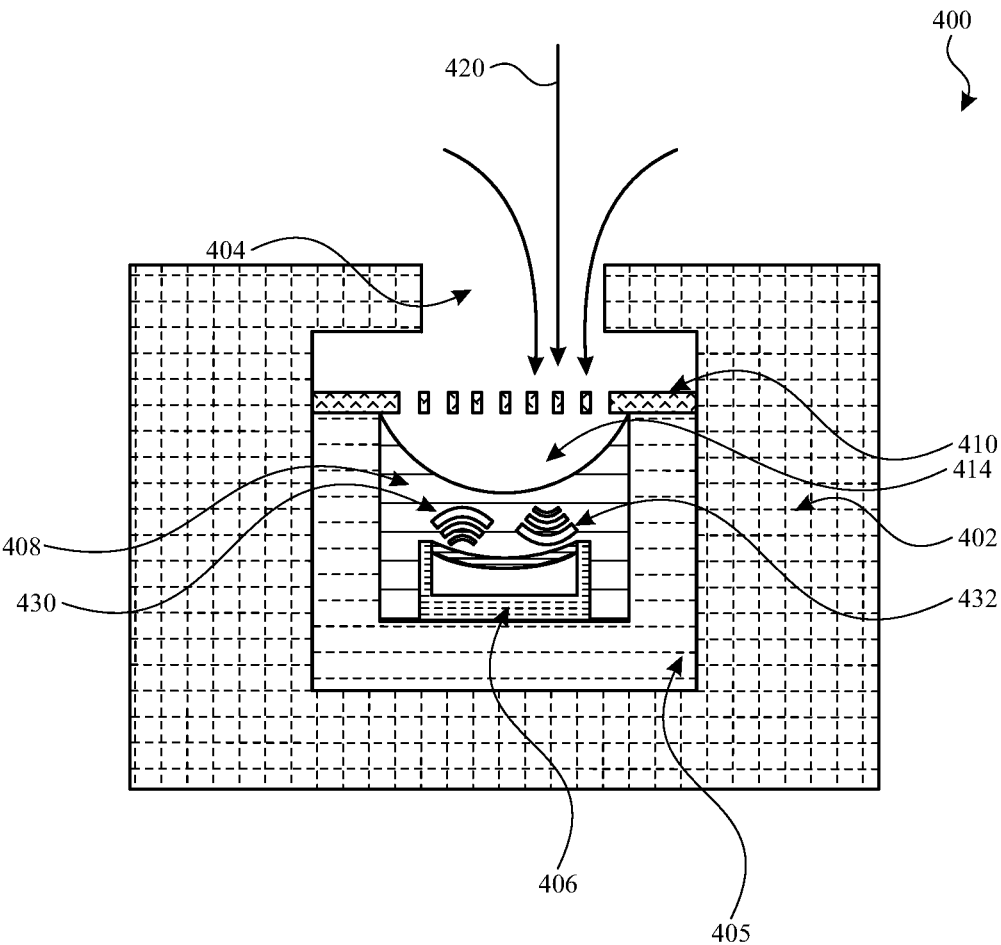
FIG. 4 is a schematic diagram illustrating a cross-sectional view of an example of a pressure-sensing apparatus with an active aggressor detection using ultrasonic waves, in accordance with various aspects of the subject technology.

FIG. 4 is a schematic diagram illustrating a cross-sectional view of an example of a pressure-sensing apparatus 400 with an active aggressor detection using ultrasonic waves, in accordance with various aspects of the subject technology. The pressure-sensing apparatus 400 (hereinafter, apparatus 400) is similar to the apparatus 200 of FIG. 2 and includes a housing 402, a port 404, a pressure sensor device 406, a sensor device container 405, a water-proofing medium 408 (e.g., a gel), and a protective cover 410 (e.g., a mesh or a cap with holes). The port 404 allows exposure to the surrounding environment. In some aspects, the surrounding environment can be a liquid (such as water), in which case the pressure sensor device 406 is a liquid (water) pressure sensor and the port 404 exposes the apparatus 400 to the liquid (water) that forms an inflow 420. In other aspects, the surrounding environment can be an atmosphere, in which case the pressure sensor device 406 is a barometric pressure sensor and the port 404 exposes the apparatus 400 to the inflow 420, which in this case can be a gas (e.g., air). The apparatus 400, however, is an improved version of the apparatus 200 in the sense that it includes a number of (e.g., two or more) electrodes, which are capable of transmitting or receiving ultrasonic waves. This statement, however, should not be interpreted as a limiting factor for the apparatus 200. The ultrasonic waves 430 transmitted by the transmitter electrode(s) (not shown for simplicity) travel through the water-proofing medium 408 and are reflected back from the top surface (interface with the cavity 414) of the water-proofing medium 408, the protective cover 410 and/or the housing 402. The reflected ultrasonic waves 432 are received by the receiver electrode(s) (not shown for simplicity), which convert the reflected ultrasonic waves 432 into electrical signals. When there are particulate matters within the cavity 414, the reflections from these particulate matters also contribute to the electrical signals.

As explained above, the profile (shape) of the top surface of the water-proofing medium 408 can vary based on the amount of the aggressor (e.g., a liquid such as water) accumulated in the cavity 414 resulting from the inflow 420. The detection of the presence of the aggressor is performed by a processor (e.g., 174 of FIG. 1E) that receives electrical signals from the receiver electrodes. The processor analyzes the electrical signals to detect a change in the surface profile of the water-proofing medium. In one or more implementations, the processor invalidates pressure measurement results (data) based on a detected change in the surface profile of the gel, for example, when the change in the surface profile is significantly (e.g., more than 30%) different from the profile of the gel in the absence of any aggressor. The processor can use the detected change in the surface profile of the gel to calibrate the pressure sensor if the change is not significantly different (e.g., less than or equal to 30%).

Figure 5:
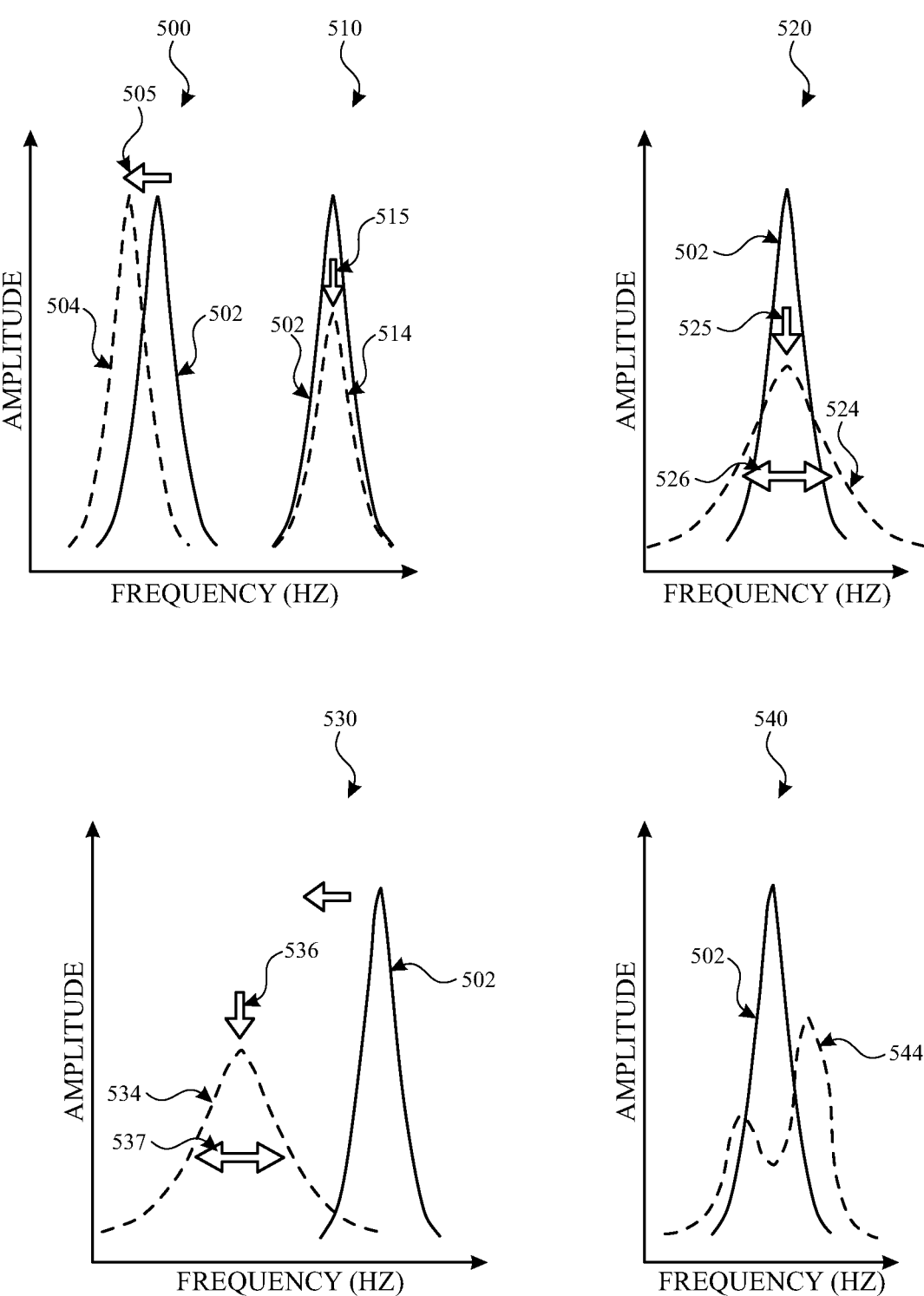
FIG. 5 shows plots of resonance-peak shift, amplitude shift, and shape changes of resonance characteristics associated with a pressure-sensing apparatus with an active aggressor detection, in accordance with various aspects of the subject technology.

FIG. 5 shows plots 500, 510, 520, 530, and 540 corresponding to resonance-peak shift, amplitude shift, and shape changes of resonance characteristics associated with a pressure-sensing apparatus with an active aggressor detection, in accordance with various aspects of the subject technology. The plots 500, 510, 520, 530, and 540 show an original resonance peak 502, which is associated with the membrane 304 of FIG. 3B when no aggressor is present, and shifted resonance peaks 504, 514, 524, 534, and 544, which are due to the presence of an aggressor. The plot 500 is an amplitude (Volt) versus frequency (Hz) plot and depicts the original resonance peak 502 and the shifted (indicated by the arrow 505) resonance peak 504, which has experienced a shift in resonance frequency with respect to the original resonance peak 502. The shift to the left of the original resonance peak 502, as depicted by the arrow 505, is due to the presence of an aggressor. The added weight/mass of the aggressor can shift the resonance frequency to lower frequency. The amplitude is not reduced significantly for this scenario, as compared to other scenarios. The plot 510 is another amplitude (Volt) versus frequency (Hz) plot and shows the original resonance peak 502 and the shifted resonance peak 514 with a shift in amplitude indicated by the arrow 515, with respect to the original resonance peak 502. The shift in the amplitude of the original resonance peak 502, as depicted by the arrow 515 indicates the presence of one or more aggressor, the added weight/mass of which affects (reduces) the frequency response amplitude, whereas the shift in frequency is not significant. plot 520 is yet another amplitude (Volt) versus frequency (Hz) plot and depicts the original resonance peak 502 and the shifted resonance peak 524 having a shift in amplitude, as indicated by the arrow 525, and a change of the width, as indicated by the arrow 526, with respect to the original resonance peak 502. The shift in the amplitude and the change in the widths of the original resonance peak 502, as depicted by the arrows 525 and 526 indicate that the presence of the aggressor can change the frequency response shape. The plot 530 is yet another amplitude (Volt) versus frequency (Hz) plot and shows the original resonance peak 502 and the shifted resonance peak 534, which has experienced a shift in resonance frequency, amplitude, and width with respect to the original resonance peak 502, as respectively shown by arrows 535, 536 and 537. The shifts in resonance frequency, amplitude, and width with respect to the original resonance peak 502, as respectively shown by arrows 535, 536 and 537, are due to the presence of aggressors. The shift to lower frequencies is expected due to the added weight/mass from the aggressor, which can also cause widening of the frequency response, as the quality factor of the resonance system is reduced by the aggressor. The plot 540 is yet another amplitude (Volt) versus frequency (Hz) plot and depicts the original resonance peak 502 and the shifted resonance peak 544 having a different shape as compared to the original resonance peak 502. The cause of the shift is the added aggressor on top of the sensor. The shape can be significantly different if there are combination of solid particles distributed randomly on top of the sensor, and/or in addition to liquid aggressor. The different material on top of the sensor can create different frequency response and could change the original frequency response.

Figure 6:
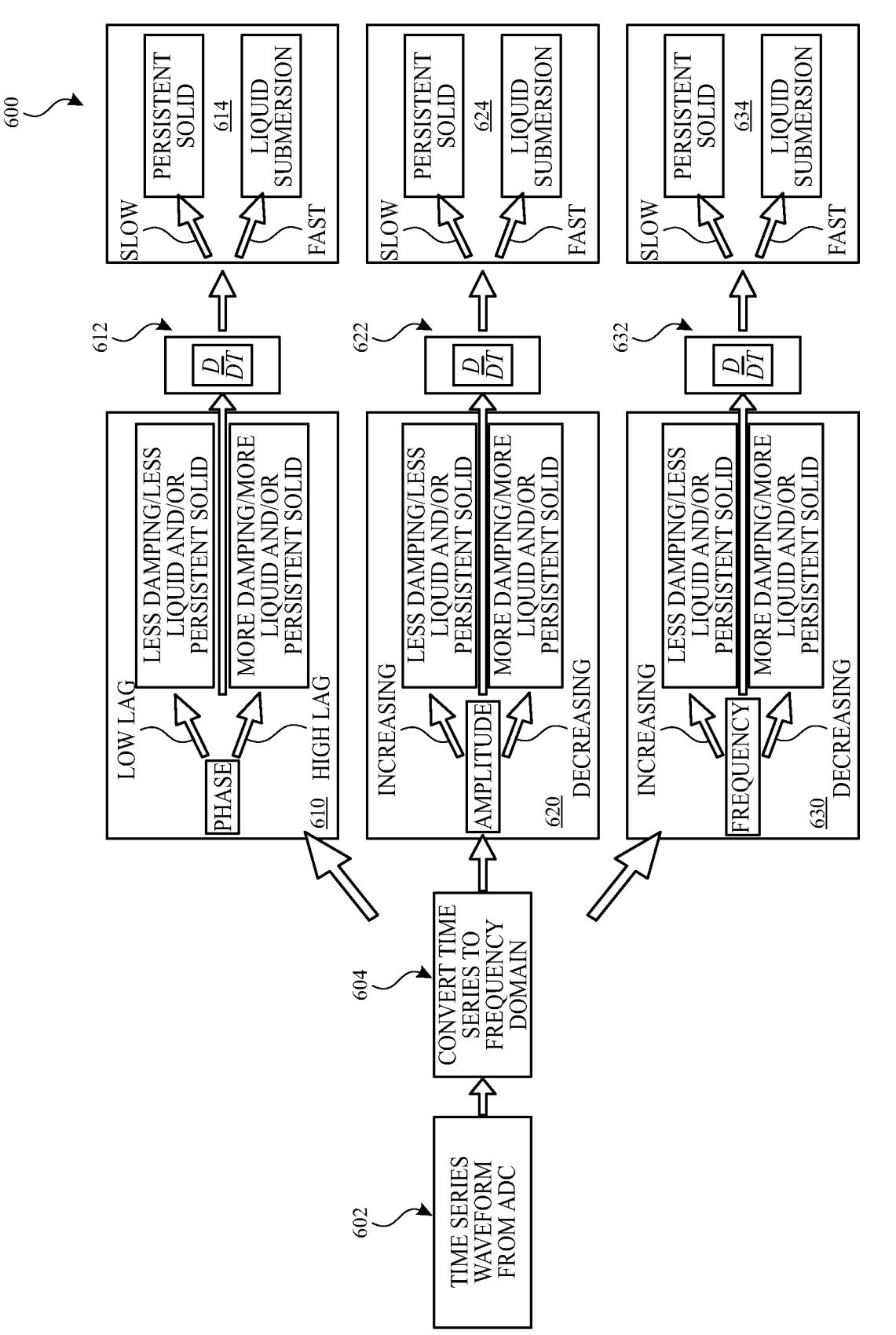
FIG. 6 is a flow diagram illustrating an example of an algorithm for an active aggressor detection by the electronic device of FIG. 1E, in accordance with various aspects of the subject technology.

FIG. 6 is a flow diagram illustrating an example of an algorithm 600 for an active aggressor detection by the electronic device of FIG. 1E, in accordance with various aspects of the subject technology. The algorithm 600 starts at operation block 602, where the time series waveforms received from the ADC 172 of FIG. 1E are received by the processor 174 of FIG. 1E. At operation block 604, the processor 174 converts the time series waveforms to frequency domain signals (e.g., Fourier series). At operation block 610, a phase of the frequency domain signals is analyzed by the processor 174. A phase showing a low lag is indicative of less damping of the membrane (e.g., 304 of FIG. 3B), which can be associated with less amount of an aggressor (e.g., liquid such as water and/or solid) over the membrane. On the other hand, a phase showing a high lag indicates more damping, which can be associated with more aggressor over the membrane.

At operation block 620, an amplitude of the frequency domain signals is analyzed by the processor 174. An amplitude showing an increasing trend is indicative of less damping of the membrane, which can be associated with less amount of an aggressor over the membrane. Conversely, a phase showing a decreasing trend indicates more damping, which can be associated with a greater amount of an aggressor over the membrane.

At operation block 630, a frequency of the frequency domain signals is analyzed by the processor 174. A frequency showing an increasing trend is an indicative of less damping of the membrane, which can be associated with less amount of an aggressor over the membrane. On the other hand, a frequency showing a decreasing trend indicates more damping, which can be associated with a greater amount of an aggressor over the membrane.

At operation blocks 612, 622, and 632, time derivatives (d/dt) in the frequency domain of the phase, amplitude, and frequency of the frequency domain signals are determined, respectively. At operation block 614, the time derivative of the phase of the frequency domain signals is analyzed by the processor 174. If the time derivative of the phase is slow, it is determined that the aggressor is a solid. However, if the time derivative of the phase is fast, it is determined that the aggressor is a liquid resulting from liquid submersion.

At operation block 624, the time derivative of the amplitude of the frequency domain signals is analyzed by the processor 174. If the time derivative of the amplitude is slow, it is determined that the aggressor is a solid, whereas if the time derivative of the phase is fast, it is determined that the aggressor is a liquid resulting from liquid submersion.

At operation block 634, the time derivative of the frequency of the frequency domain signals is analyzed by the processor 174. If the time derivative of the frequency is slow, it is determined that the aggressor is a solid. However, if the time derivative of the frequency is fast, it is determined that the aggressor is a liquid resulting from liquid submersion.

The speed of the time derivatives can also be dependent on the type of liquid. For example, if the liquid aggressor is purely water, it follows the evaporation time response based on the pressure, temperature and humidity of the environment. On the other hand, if the liquid aggressor contains chemicals and the viscosity is significantly higher, the evaporation rate may be substantially slower. For solid, it can be substantially stable over a long period of time, and the only time it will change is if there are any mechanical shock which may shift the particles to a different position.

Therefore, the active aggressor detection technique of the subject technology is able to determine the type of the aggressor, as well as an indication of a low or high level of damping of the membrane as a result of accumulation of the aggressor over the membrane. More accurate detection results can be obtained by repeated experimentation and calibration of the pressure sensor device.

Figure 7:
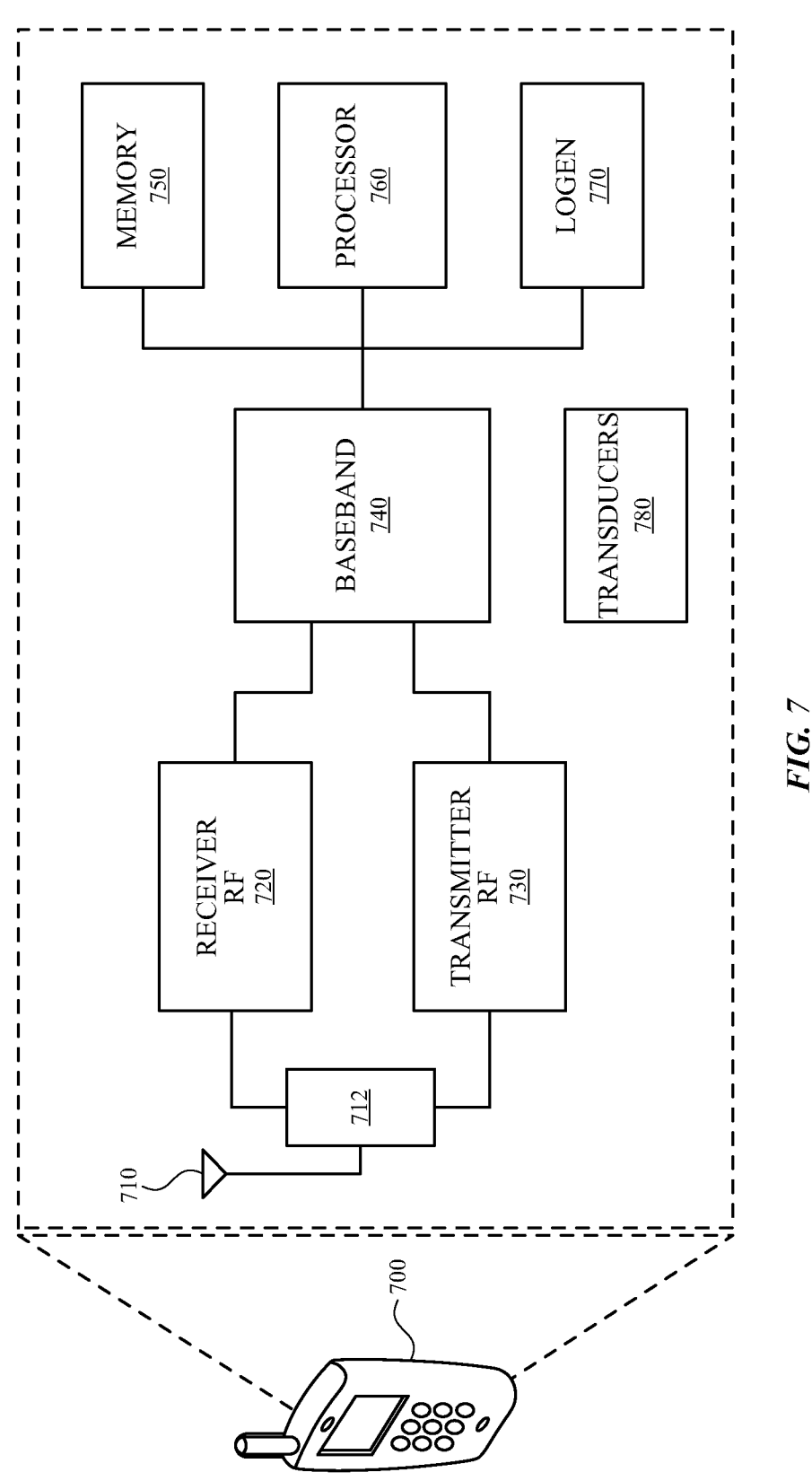
FIG. 7 illustrates a wireless communication device within which some aspects of the subject technology are implemented.

FIG. 7 illustrates a wireless communication device 700, within which some aspects of the subject technology are implemented. In one or more implementations, the wireless communication device 700 can be a tablet, smartphone, smartwatch, or other electronic device that can include a pressure sensor. In one or more implementations, the wireless communication device 700 represents and/or performs the functionalities of the electronic device 100E of FIG. 1E described above. The wireless communication device 700 may include a radio-frequency (RF) antenna 710, a duplexer 712, a receiver 720, a transmitter 730, a baseband processing module 740, a memory 750, a processor 760, a local oscillator generator (LOGEN) 770, and a transducer module 780. In various aspects of the subject technology, one or more of the blocks represented in FIG. 7 may be integrated on one or more semiconductor substrates. For example, the blocks 720-770 may be realized in a single chip, a single system on a chip, or in a multichip chipset.

The receiver 720 may include suitable logic circuitry and/or code that may be operable to receive and process signals from the RF antenna 710. The receiver 720 may, for example, be operable to amplify and/or downconvert received wireless signals. In various aspects of the subject technology, the receiver 720 may be operable to cancel noise in received signals and may be linear over a wide range of frequencies. In this manner, the receiver 720 may be suitable for receiving signals in accordance with a variety of wireless standards such as Wi-Fi, WiMAX, Bluetooth (BT), and various cellular standards. In various aspects of the subject technology, the receiver 720 may not use any sawtooth acoustic wave filters and few or no off-chip discrete components such as large capacitors and inductors.

The transmitter 730 may include suitable logic circuitry and/or code that may be operable to process and transmit signals from the RF antenna 710. The transmitter 730 may, for example, be operable to upconvert baseband signals to RF signals and amplify RF signals. In various aspects of the subject technology, the transmitter 730 may be operable to upconvert and amplify baseband signals processed in accordance with a variety of wireless standards. Examples of such standards may include Wi-Fi, WiMAX, BT, and various cellular standards. In various aspects of the subject technology, the transmitter 730 may be operable to provide signals for further amplification by one or more power amplifiers.

The duplexer 712 may provide isolation in the transmit band to avoid saturation of the receiver 720 or damaging parts of the receiver 720, and to relax one or more design requirements of the receiver 720. Furthermore, the duplexer 712 may attenuate the noise in the receiving band. The duplexer 712 may be operable in multiple frequency bands of various wireless standards.

The baseband processing module 740 may include suitable logic, circuitry, interfaces, and/or code that may be operable to perform the processing of baseband signals. The baseband processing module 740 may, for example, analyze received signals and generate control and/or feedback signals for configuring various components of the wireless communication device 700, such as the receiver 720. The baseband processing module 740 may be operable to encode, decode, transcode, modulate, demodulate, encrypt, decrypt, scramble, descramble, and/or otherwise process data in accordance with one or more wireless standards.

The processor 760 may include suitable logic, circuitry, and/or code that may facilitate processing data and/or controlling operations of the wireless communication device 700. In this regard, the processor 760 may be facilitated to provide control signals to various other portions of the wireless communication device 700. The processor 760 may also control the transfer of data between various portions of the wireless communication device 700. Additionally, the processor 760 may facilitate implementation of an operating system or otherwise execute code to manage operations of the wireless communication device 700. In one or more implementations, the processor 760 may be interfaced with the transducer module 780 via standard host interface technologies such as an inter-integrated circuit (I2C), a serial interface protocol (SPI), a peripheral component interconnect express (PCIE), a universal asynchronous receiver-transmitter (UART), and/or other interface technologies, depending on the data rate needed to sample and pipe from the transducer module to the processor 760.

The memory 750 may include suitable logic, circuitry, and/or code that may facilitate storage of various types of information such as received data, generated data, code, and/or configuration information. The memory 750 may include, for example, RAM, ROM, flash, and/or magnetic storage. In various aspects of the subject technology, information stored in the memory 750 may be utilized for configuring the receiver 720 and/or the baseband processing module 740.

The LOGEN 770 may include suitable logic, circuitry, interfaces, and/or code that may be operable to generate one or more oscillating signals of one or more frequencies. The LOGEN 770 may be operable to generate digital and/or analog signals. In this manner, the LOGEN 770 may be operable to generate one or more clock signals and/or sinusoidal signals. Characteristics of the oscillating signals, such as the frequency and duty cycle, may be determined based on one or more control signals from, for example, the processor 760 and/or the baseband processing module 740.

In operation, the processor 760 may configure the various components of the wireless communication device 700 based on a wireless standard according to which it is designed to receive signals. Wireless signals may be received via the RF antenna 710, amplified, and down converted by the receiver 720. The baseband processing module 740 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 700, data to be stored to the memory 750, and/or information affecting and/or enabling operation of the wireless communication device 700. The baseband processing module 740 may modulate, encode, and perform other processing on audio, video, and/or control signals to be transmitted by the transmitter 730 in accordance with various wireless standards. In one or more implementations, the transducer module 780 may include, but is not limited to, the apparatus 100A, 200, and 400 of FIGS. 1A, 2, and 4, respectively. In one or more implementations, the processor 760 may process signals received from electrodes of these apparatus, for example, electrodes 154 and 156 of FIG. 1C, and perform the dynamic resonance peak analysis described above. In some implementations, the processor 760 performs the algorithm 600 of FIG. 6.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Various functions described above can be implemented in digital electronic circuitry, as well as in computer software, firmware, or hardware. The techniques can be implemented by using one or more computer program products. Programmable processors and computers can be included in or packaged as mobile devices. The processes and logic flows can be performed by one or more programmable processors and by one or more programmable logic circuitries. General and special-purpose computing devices and storage devices can be interconnected through communication networks.

Some implementations include electronic components such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, and flash memory. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multicore processors that execute software, some implementations are performed by one or more integrated circuits such as application-specific integrated circuits (ASICs) or field-programmable gate arrays (FPGAs). In some implementations, such integrated circuits execute instructions that are stored on the circuit itself.

As used in this specification and any claims of this application, the terms "computer," "processor," and "memory" all refer to electronic or other technological devices. These terms exclude people or groups of people. For the purposes of the specification, the terms "display" or "displaying" shall mean displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user, and a keyboard and a pointing device, such as a mouse or a trackball, by which the user can provide input to the computer. Other kinds of devices can be used to provide interaction with a user as well; for example, feedback provided to the user can be any form of sensory feedback such as visual feedback, auditory feedback, or tactile feedback. Input from the user can be received in any form, including acoustic, speech, or tactile input.

Many of the above-described features and applications are implemented as software processes that are specified as a set of instructions recorded on a computer-readable storage medium (also referred to as a computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, flash drives, RAM chips, hard drives, and EPROMs. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as subparts of a larger program while retaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer, on multiple computers that are located at one site, or distributed across multiple sites interconnected by a communication network.

It is understood that any specific order or hierarchy of blocks in the processes disclosed is an illustration of an example approach. Based upon design preferences, it is understood that the specific order or hierarchy of blocks in the processes may be rearranged or that all illustrated blocks be performed. Some of the blocks may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to facilitate any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation, or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an "aspect" may refer to one or more aspects, and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration." Any aspect or design described herein as an "example" is not necessarily to be construed as preferred or advantageous over other aspects or designs. All structural and functional equivalents to the elements of the various aspects described throughout this disclosure that are known, or later come to be known, to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for," or, in the case of a method claim, the element is recited using the phrase "step for." Furthermore, to the extent that the terms "include," "have," or the like are used in the description or the claims, such terms are intended to be inclusive in a manner similar to the term "comprise," as "comprise" is interpreted when employed as a transitional word in a claim.

What is claimed:

1. An apparatus comprising:
a housing including a port exposed to an environment; and
a pressure sensor disposed within the housing and configured to measure a pressure of the environment,
wherein the pressure sensor includes a membrane configured to facilitate detection of a presence of an aggressor by using a dynamic response analysis, wherein the membrane includes two or more electrodes configured to sense and actuate respectively to facilitate the dynamic response analysis.

2. The apparatus of claim 1, wherein the environment comprises water and the pressure sensor comprises a water pressure sensor, and wherein the aggressor comprises water.

3. The apparatus of claim 1, wherein the environment comprises an atmosphere and the pressure sensor comprises a barometric pressure sensor, and wherein the aggressor comprises particulate matter and water.

4. The apparatus of claim 1, wherein the membrane is configured to facilitate detection of the presence of the aggressor within a cavity between the housing and the membrane.

5. The apparatus of claim 1, wherein at least one of the two or more electrodes is configured to operate in a pressure-sensing mode and at least another one of the two or more electrodes is configured to operate in an actuating mode to facilitate the dynamic response analysis.

6. The apparatus of claim 5, wherein at least one of the two or more electrodes is configured to operate in the actuating mode and the pressure-sensing mode in different time intervals, and wherein the dynamic response analysis is performed by using a processor configured to detect a shift in a resonance frequency of the membrane based on signals received from at least one of the two or more electrodes.

7. The apparatus of claim 1, wherein the dynamic response analysis is performed by using a processor configured to detect a change of a peak amplitude of a resonance characteristic of the membrane based on signals received from at least one of the two or more electrodes.

8. The apparatus of claim 1, wherein the dynamic response analysis is performed by using a processor configured to detect a shift in a resonance frequency and change of a peak amplitude of a resonance characteristic of the membrane based on signals received from at least one of the two or more electrodes.

9. The apparatus of claim 1, wherein the dynamic response analysis is performed by using a processor configured to detect a change in a shape of a resonance characteristic of the membrane based on signals received from at least one of the two or more electrodes.

10. The apparatus of claim 1, wherein the dynamic response analysis is performed by using a processor configured to analyze, in a frequency domain, a phase, an amplitude, and a frequency of signals received from at least one of the two or more electrodes.

11. The apparatus of claim 1, wherein the dynamic response analysis is performed by using a processor configured to derive a time derivative in a frequency domain of signals received from at least one of the two or more electrodes.

12. The apparatus of claim 1, further comprising a water-proofing medium partially filling a cavity between the housing and the membrane, wherein the water-proofing medium comprises a gel, wherein the membrane includes at least two electrodes configured to facilitate detection of a surface profile of the water-proofing medium using ultrasonic waves.

13. The apparatus of claim 1, further comprising a protective cover, including one of a mesh or a cap including a plurality of holes, wherein the plurality of holes of the cap are arranged to be offset from a projection of the port over the protective cover.

14. An electronic device comprising:
a pressure-sensing apparatus configured to operate in a sensing mode and an actuating mode and to generate pressure signals and resonance signals; and
a processor configured to process the pressure signals and the resonance signals,
wherein the pressure-sensing apparatus comprises:
a housing including a port exposed to an environment; and
a pressure sensor device, including two or more electrodes placed on a membrane and configured to:
facilitate measurement of a pressure of the environment and provide the pressure signals; and
facilitate detection of a presence of an aggressor by providing the resonance signals,
wherein the resonance signals are associated with the membrane.

15. The electronic device of claim 14, wherein the processor is configured to process the resonance signals by analyzing, in a frequency domain, phases, amplitudes, and frequencies of the resonance signals to detect a level of damping of the membrane that determines an amount of the aggressor.

16. The electronic device of claim 14, wherein the processor is configured to process the resonance signals by analyzing, in a frequency domain, time derivatives of the resonance signals to detect a type of the aggressor.

17. The electronic device of claim 14, wherein the processor is configured to invalidate pressure measurement results based on a result of an analysis of the resonance signals to calibrate the pressure sensor device.

18. The electronic device of claim 14, wherein the environment comprises one of a liquid or an atmosphere and the pressure sensor device comprises a water pressure sensor or a barometric pressure sensor, and wherein the aggressor comprises at least one of water or particulate matter.

19. An apparatus comprising:
a housing including a port exposed to an environment; and
a pressure sensor disposed within the housing and configured to measure a pressure of the environment,
wherein the pressure sensor includes:
a membrane configured to facilitate detection of a presence of an aggressor by operating in a traveling-wave mode, wherein the membrane includes two or more electrodes configured to transmit and receive ultrasonic waves respectively to facilitate the traveling-wave mode.

20. The apparatus of claim 19, further comprising a water-proofing medium partially filling a cavity between the housing and the membrane, wherein the water-proofing medium comprises a gel, the environment comprises water, the pressure sensor comprises a water pressure sensor, and the aggressor comprises water, and wherein at least one of the two or more electrodes is used for transmitting ultrasonic waves and at least another one of the two or more electrodes is used to receive reflected ultrasonic waves and convert them to electrical signals, wherein in the traveling-wave mode, the detection of the presence of the aggressor is performed by a processor configured to analyze the electrical signals to detect a change in a surface profile of the water-proofing medium, and wherein the processor is configured to invalidate pressure measurement results based on a detected change in the surface profile of the gel or use the detected change in the surface profile of the gel to calibrate the pressure sensor.

* * * * *